United States Patent [19]

Gurley

[11] 4,204,227
[45] May 20, 1980

[54] TELEVISION PICTURE COMPRESSOR

[75] Inventor: Thomas M. Gurley, Maple Shade, N.J.

[73] Assignee: RCA Corporation, New York, N.Y.

[21] Appl. No.: 862,180

[22] Filed: Dec. 19, 1977

[30] Foreign Application Priority Data

Mar. 21, 1977 [GB] United Kingdom ............... 11904/77

[51] Int. Cl.² .................... H04N 9/02; H04N 5/22
[52] U.S. Cl. ......................... 358/138; 358/13; 358/22; 358/133; 358/183
[58] Field of Search ............... 364/515; 358/133, 138, 358/183, 13, 22

[56] References Cited

U.S. PATENT DOCUMENTS

| 2,921,124 | 1/1960 | Graham | 358/138 |
| 3,795,763 | 3/1974 | Golding | 358/13 |
| 3,803,348 | 4/1974 | Limb | 358/22 |
| 3,946,432 | 3/1976 | Goldberg | 358/13 |
| 4,037,248 | 7/1977 | Iijima | 358/13 |
| 4,063,280 | 12/1977 | Hattori | 358/22 |

OTHER PUBLICATIONS

Matley, J. Brian, "A Digital Framestore Synchronizer", *Journal of SMPTE*, Jun. 1976, vol. 85, No. 6, pp. 385–387.

*Primary Examiner*—Howard W. Britton
*Attorney, Agent, or Firm*—Eugene M. Whitacre; Paul J. Rasmussen; Robert L. Troike

[57] ABSTRACT

A television picture compressor for use with a video synchronizer provides means for sampling the video and providing a predetermined number of samples of video per line and lines per field. The compression of the television picture is provided by means for reducing the samples per line and lines per field. The compressor includes means for averaging the surrounding picture samples to be deleted to determine the value of each compressed picture sample to be maintained.

18 Claims, 8 Drawing Figures

TELEVISION PICTURE COMPRESSOR

BACKGROUND OF THE INVENTION

This invention relates to a television picture size altering apparatus and, more particularly, a picture compressor for reducing a picture from its original full raster size to a fraction of that original size.

A television picture size altering apparatus for changing the size of the television picture is described in application Ser. No. 754,688 of Robert N. Hurst, filed Dec. 27, 1976 entitled "Television Picture Size Altering Apparatus," now U.S. Pat. No. 4,134,128. In the example given in the above cited application, the apparatus reduced a full raster to one-quarter of the original size. In that application, it was pointed out that a reduced size picture could be obtained by deleting some of the picture elements or samples of the original signal while maintaining other picture elements of the original signal. The picture samples that were maintained were placed next to one another filling in the holes, resulting from the deletion of the other picture samples. This technique does produce a reduced size picture as is described, however, the display picture may exhibit unacceptable television moire patterns. These moire patterns result from sampling the signal below the Nyquist rate.

SUMMARY OF THE INVENTION

A television picture compressor is provided for reducing the size of the television picture. The compressor is useable in a device such as a video synchronizer which provides means for sampling the video and providing a predetermined number of samples per line and lines per field. The compressor reduces the number of samples per line and lines per field by averaging the surrounding picture samples to be deleted to determine the value of the compressed picture sample to be maintained to thereby reduce moire patterns.

DESCRIPTION OF THE INVENTION

Figure 1:
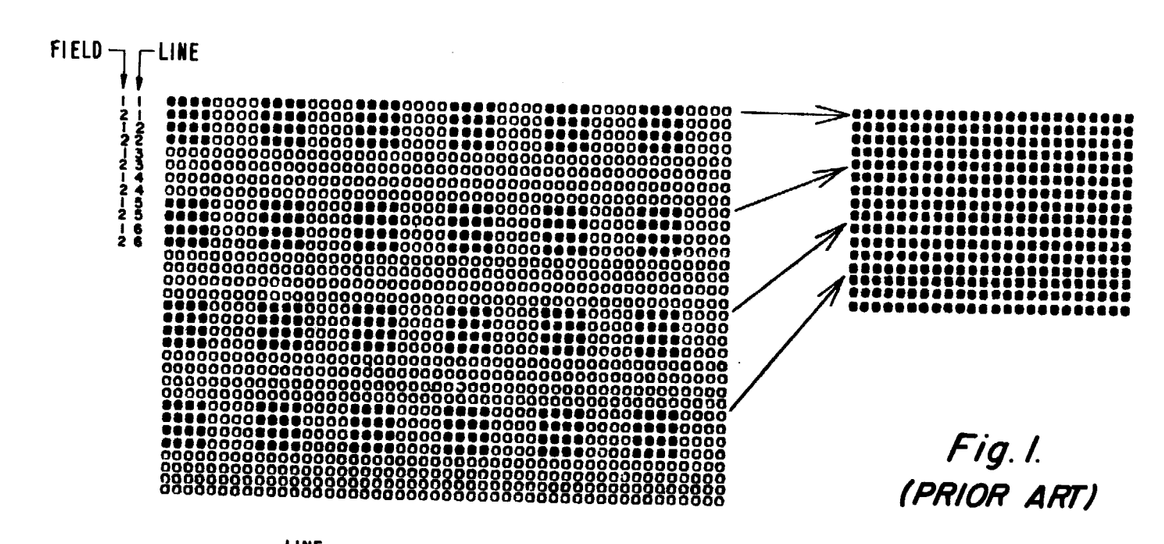
FIG. 1 is a model illustrating picture compression.

Referring to FIG. 1, there is illustrated for example a full sized raster of picture samples or elements. This diagram shows only 48 picture elements per line although 768 picture samples or elements would be more typical and only 32 lines per frame although 512 would be more typical. In the referenced U.S. Pat. No. 4,134,128 of Hurst, picture compression would result with the video sampled, for example, at four times the color subcarrier frequency (four samples per subcarrier cycle) by maintaining the first four picture elements or samples and deleting the second four samples, maintaining the third four picture samples and placing them next to the first four picture samples, deleting the next four samples, etc. The picture elements in the second line of a field are maintained and deleted (maintain first four and delete the second four, etc.) in an identical manner. All picture elements or samples in the third and fourth lines of the field are deleted. The samples in the fifth and sixth lines of the field are maintained and deleted as in the first and second lines (first four maintained, second four deleted). Because of the interlaced field nature of a television frame treating the two fields in a like manner would produce the effect illustrated in FIG. 1. Picture samples are maintained or deleted in a 4×4 matrix format (four samples per line, four lines per frame) to preserve the color of the original signal.

Figure 2:
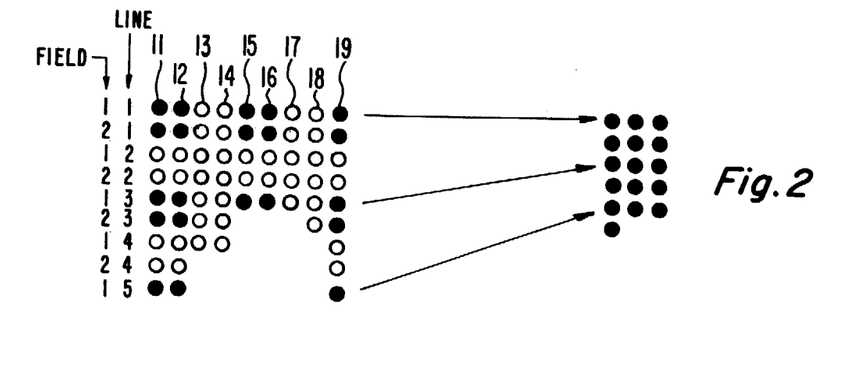
FIG. 2 is a model similar to FIG. 1 illustrating picture compression according to the present invention.

Because of the large number of picture samples deleted, there are many "holes" in the picture. The large size of these holes can produce an undesirable television moire pattern in the output picture. To eliminate this undesirable effect, a 2×2 matrix as illustrated in FIG. 2 is used. In the 2×2 matrix, two elements or samples are maintained and two are deleted and then again the third two samples are maintained and the fourth pair are deleted, etc. as illustrated in line 1 of FIG. 2. Every other line of the field is skipped as indicated by line 2 of field 1 in FIG. 2 being skipped. Because of the interlaced field nature of a television frame treating two fields in like manner would produce the effect of a 2×2 matrix format shown.

The system described herein samples at four times the color subcarrier frequency or four samples per subcarrier cycle. These picture elements or samples are for example in an 8-bit code with that code indicating luminance and chrominance information. The picture samples that are provided are determined in such a way that the picture elements which will be deleted are averaged into the value of the centered compressed picture sample. This eliminates the "holes" that were observable in the original 4×4 matrix format discussed above and thus significantly reduces the television moire patterns.

Figure 3:
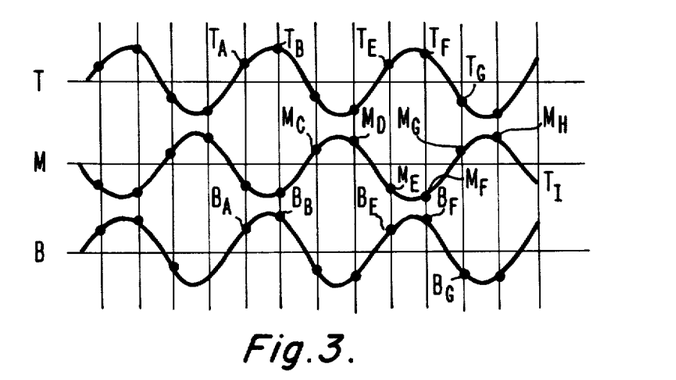
FIG. 3 illustrates adjacent subcarrier field lines and sampling points and how samples are averaged to form a phase non-inverting compressed picture sample.

FIG. 3 illustrates for example how the value of the first one of the first pair of compressed picture samples may be obtained. In FIG. 3, the line M indicates the field line for which samples are to be provided. Line B indicates the field line below line M where line B is to be deleted and line T indicates the field line above line M where line T is to be deleted. The waveform on these lines represents a subcarrier with the dots being the sampling points. The samples of $T_A$ $T_E$ $B_A$ and $B_E$ are the surrounding in phase picture samples of sample $M_C$ which are averaged into the value of original sample $M_C$ to form the value of the final sample $M_{C\ new}$ to be maintained. This is for example sample 11 in FIG. 2. The manner in which the surrounding samples are averaged with the old sample $M_C$ is explained mathematically by $M_{C\ new}$ (first averaged sample 11) is equal to $\frac{1}{2} M_{C\ orig} + \frac{1}{8} T_A + \frac{1}{8} T_E + \frac{1}{8} B_A + \frac{1}{8} B_E$ where $M_{C\ orig}$ is the sample taken at point $M_C$ and $T_A$ is the value of the sample at point $T_A$, $T_B$ is the value of the sample at sampling point $T_B$, $B_A$ is the value of the sampling point $B_A$ and $B_E$ is the value of sample at sampling point $B_E$. The samples at these points $T_A$, $T_E$, $B_A$ and $B_E$ are to be deleted since every other line of the field in the example is deleted. The phase of $M_C$ is identical to the phase of the samples at point $T_A$ $T_E$ $B_A$ and $B_E$. The second sample or sample 12 of the pair in FIG. 2 is provided in the identical manner of sample $M_C$. Assuming that the sample would be at $M_D$ in FIG. 3 with the sampling points averaged at points $T_B$ $B_B$ $T_F$ $B_F$, the value of $M_D$ $_{new}$ may be expressed as equal to $\frac{1}{2}M_{D\ orig} + \frac{1}{8}T_B + \frac{1}{8}T_F + \frac{1}{8}B_B + \frac{1}{8}B_F$. The phase of $M_D$ is identical to the phase of $T_B$ $T_F$ $B_B$ and $B_E$. As indicated previously, the next two sampling points 13 and 14 in FIG. 2 are deleted or points $M_E$ and $M_F$ in FIG. 3. The next two sampling points 15 and 16 or points $M_G$ and $M_H$ in FIG. 3 are in phase with the previous two sampling points $M_C$ and $M_D$. The second pair of picture samples are therefore identical to the color subcarrier phase of the first pair of picture samples. In order to preserve the continuity of the original subcarrier signal, this relative phase must be 180° and not 0°. As a result, it is necessary to perform an inversion of the color subcarrier for samples 15 and 16 in FIG. 2.

Figure 4:
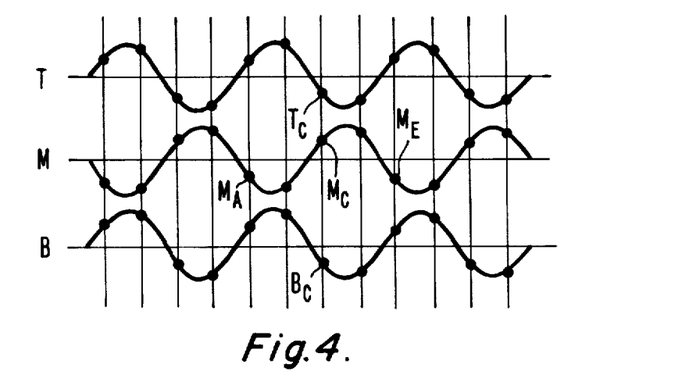
FIG. 4 illustrates adjacent subcarrier field lines and sampling points and how original samples are averaged to form phase inverting compressed picture sample.

FIG. 4 illustrates how the average of the surrounding picture samples with the 180° phase difference is provided. Line M represents the line of a field from which samples are to be maintained and $M_C$ represents the compressed picture sample 15 in FIG. 2 to be provided. Line T is the field line above line M and line B the field line below line M and the waveforms represent the subcarrier and the dots the sampling points. The value of $M_{C\ new}$ (of sample 15) is equal to the sum of the surrounding samples which are 180° out of phase with respect to $M_C$. The $M_{C\ new}$ may be expressed mathematically as equal to $\frac{1}{4}T_C + \frac{1}{4}M_A + \frac{1}{4}M_E + \frac{1}{4}B_C$. The samples $T_C$ and $B_C$ are the same sampling points horizontally as $M_C$ but are the samples taken in the T (top) and B (bottom) lines. These sampling points $T_C$ and $B_C$ are 180° out of phase with $M_C$ since adjacent lines are 180° out of phase. The sampling points $M_A$ and $M_E$ are in the same M (middle) line but are 180° or two sampling points on either side of $M_C$. The sample 16 would be derived in a similar manner as sample 15 and may be expressed using the same equation presented in connection with sample 15 by summing the surrounding samples that are 180° different from the sample. The samples 15 and 16 are provided at the output adjacent to samples 11 and 12. The next two samples 17 and 18 would be deleted and the next two samples 19 and 20 would be derived in the same manner as samples 11 and 12 in FIG. 2. The operation of the arrangement would thus be (1) determine a value for each of the first two picture samples of the scan line by averaging, assigning a weighting of $\frac{1}{8}$ to the surrounding four picture samples of the same phase and a weighting of $\frac{1}{2}$ to the center or "maintained" picture element of the same phase, (2) delete the second two picture elements, (3) determine a value for each of the third two picture samples of the same line by averaging, with equal weighting, the surrounding four picture samples 180° out of phase with respect to the center or "maintained picture" sample and place them next to the picture elements in step (1), (4) delete the next two picture elements, (5) repeat step (1) for the next two picture elements, (6) repeat step (2), etc. Upon completion of this scan line, the second scan line of the field would be deleted. The third scan line of the field is handled in identical manner to the first scan line except that the first two picture elements would be determined as in step (3), the second two deleted, the third two picture elements would be determined according to step (1) and placed next to the first two averaged according to step (3), the fourth two deleted and the fifth two picture elements would be determined according to step (3) and placed next to the first two picture elements determined according to step (1), etc. The next scan line of the field would be deleted, the fifth scan line of the field would be determined in an identical manner to the first mentioned scan line. In other words, alternate maintaining or deleting pairs of picture elements and if the phase of the picture elements maintained is correct, apply step (1) and if the phase is in error by 180°, apply step (3).

Figure 5:
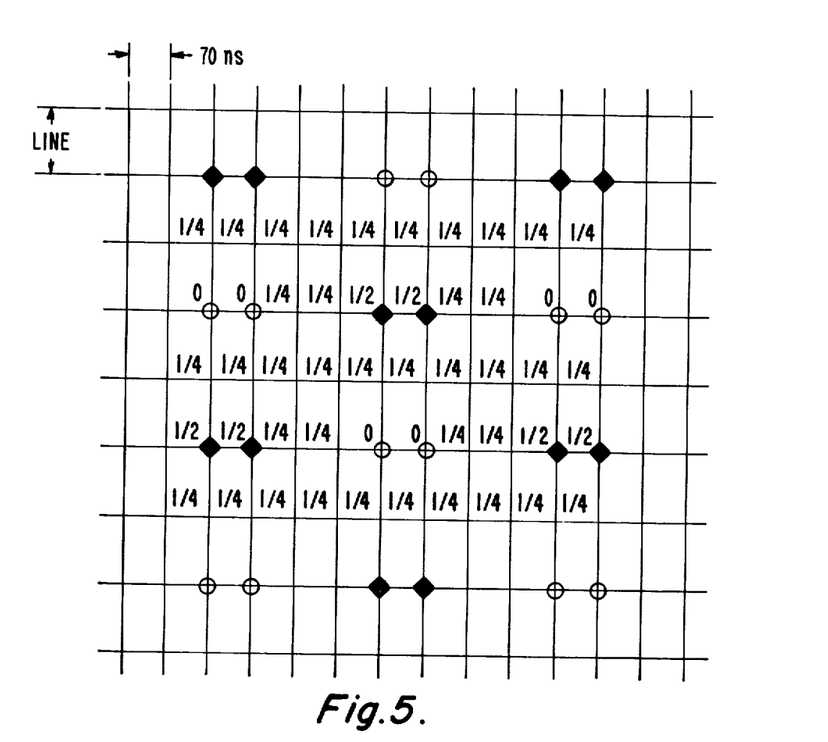
FIG. 5 is a model illustrating how each sample of the original picture is represented in the compressed picture using the present invention.

In FIG. 5 is shown the relative weighting of each of the picture elements or samples as they are represented in the compressed picture. The vertical grid lines are 70 ns (nanoseconds) apart while the horizontal grid lines represent television field line increments. Picture elements or samples correspond to the intersections of these grid lines. The encircled picture elements are those that are maintained in the compressed picture in accordance with the scheme depicted in FIG. 2. The diamond shaped elements identify those elements computed using step (1) which maintains the subcarrier phase of the original picture element. The circle shaped elements identify those elements whose values are derived according to step (3) which inverts the original subcarrier phase. The fractions written at the grid intersections in the center area of FIG. 5 note the weighting assigned to the corresponding picture element. Note that nearly all the original picture elements are represented in the compressed picture. Note also that where the diamond shaped elements appear that the original value in that location determines in part ($\frac{1}{2}$) the weighted value of the new sample at that location and where the circles appear the original sample value does not contribute to the new sample at that location.

Figure 6:
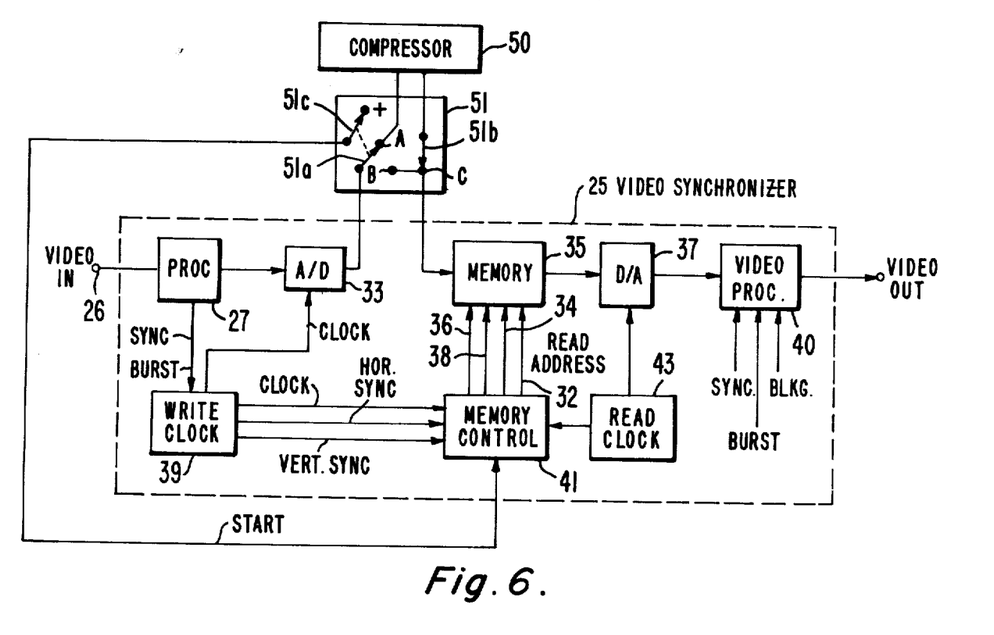
FIG. 6 is a block diagram of the present invention.

FIG. 6 is a block diagram of the system according to one embodiment of the present invention using a video synchronizer 25 outlined by the dashed lines. The video synchronizer 25 may be for example RCA type TFS-121 video synchronizer sold by RCA Broadcast Systems, Camden, N.J. The video synchronizer 25 includes processor 27, an A/D (Analog to Digital) converter 33, a memory 35, a D/A (Digital to Analog) converter 37, a write clock generator 39, a memory control 41, a read clock generator 43 and a video processor 40 and may operate in a manner similar to that described in connection with the above cited U.S. Pat. No. 4,134,128 of Robert N. Hurst. A video synchronizer is also described in the following applications: R. A. Dischert et al filed Dec. 30, 1976, Ser. No. 755,944, entitled "Television Synchronizing Apparatus" now U.S. Pat. No. 4,101,926; Hopkins et al, filed Dec. 30, 1976, Ser. No. 755,949, entitled "Television Synchronizing Apparatus," now U.S. Pat. No. 4,109,276, and Hopkins filed Dec. 30, 1976, Ser. No. 755,948, entitled "Television Synchronizing Apparatus," now U.S. Pat. No. 4,134,131. In diagram of FIG. 6 of the present disclosure, the write and read address generators are within the memory control 41. Video synchronizers are also described in several articles in Journal SMPTE. See for example Volume 83, page 300 thru 302, entitled "Digital Frame Storage for Television Video" by Scott Pursell and Harold Newby, Volume 84 pages 129 thru 134, entitled "Television Frame Synchronizer" by Kano et al, and Volume 85, No. 6, June 1976 pages 385 thru 388, entitled "A Digital Framestore Synchronizer" by J. Brian Matley. The picture video is applied at terminal 26 and is coupled to the Analog to Digital converter 33 via video processor 27. The processor 27 separates the horizontal and vertical sync and burst from the active picture. The separated timing information is coupled to write clock generator 39 which provides timing information and clock pulses. The write clock generator 39 generates strobing or sampling pulses to the A/D converter 33 for example at a rate of 14.3 MHz. In a typical system, 768 samples of video are taken on each horizontal line of the television picture. Based on the relative amplitude of these signals, a digital code for each sample is stored in the memory 35. This code may be for example an 8-bit digital code. The video is sampled at four times the subcarrier frequency (3.58 MHz) in order to store and faithfully reproduce the color subcarrier signal. At the same time, these clock pulses from the write clock generator 39 and the timing horizontal and vertical sync signals synchronized therewith cause the memory control 41 (via write address generator in the memory control) to increment a write address to the memory via multiple leads 36. In addition, memory control 41 in response to the timing signals from the write clock generator 39 provides control pulses via lead 38 to control the writing into the memory 35. Control pulses via lead 34 control the read out of the memory so read and write do not occur simultaneously. Further, memory control 41 senses the end of a line (for example by counting 768 samples from clock 39 or horizontal sync pulses) and provides that address to the memory 35. The video is read out of the memory 35 by applying clock pulses from controllable read clock generator 43 to the D/A converter 37 and the read address generator in memory control 41. The read clock pulses applied to the memory control 41 cause the read address generator in memory control 41 to supply appropriate read address via multiple leads 32 to the memory 35. Upon receipt of the clock pulses applied to D/A converter 37, video appears at the output thereof that corresponds to the coded video at the input (8-bit coded video for example). In the typical synchronizer system 25, the video output of D/A converter 37 is applied to video processor 40 where locally generated sync, burst and blanking are applied.

In the system described herein, the field compression is provided by a compressor 50 switched in by switch 51 between the A/D converter 33 and the memory 35. Field compression is accomplished in accordance with the manner previously described by providing compressed picture samples in pairs and skipping pairs where the compressed picture samples provided are derived by averaging the surrounding samples according to steps (1) and (2).

Figure 7:
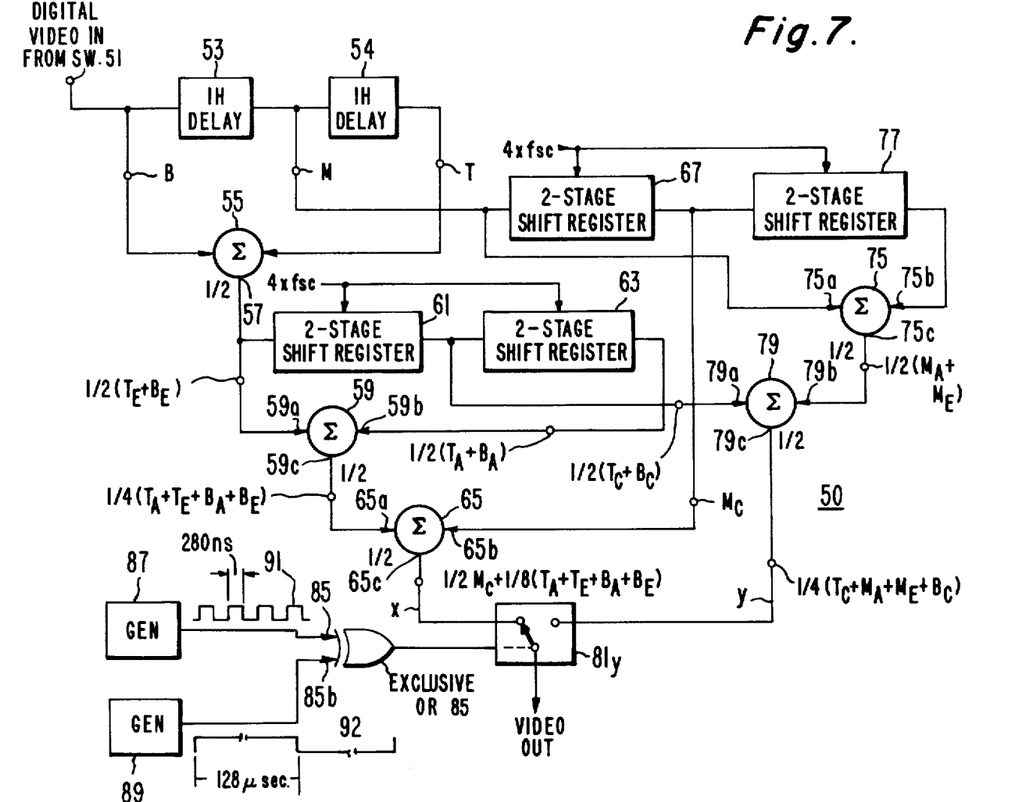
FIG. 7 is a block diagram of the compressor in FIG. 6.

Referring to FIG. 7, there is illustrated for example the compressor 50 in FIG. 6. The compressor 50 includes for example delays, summing stages and shift registers. When contact arm 51a of the switch 51 is switched into the A position, and contact arm 51b touches contact C in FIG. 6, digital video from the A/D converter is applied to the input terminal 51 of the compressor 50. The input digital video is applied to series connected delays 53 and 54 in FIG. 7. The delays 53 and 54 each provide a horizontal line time delay such that the video at the middle and adjacent top and bottom lines occur simultaneously at points T, M and B. Points T, M and B for example correspond to the top, middle and bottom lines in FIGS. 3 and 4. The top and bottom lines are summed at summer 55 in which one-half of the amplitude of these summed signals is provided at the output terminal 57. The sum at terminal 57 is applied to summer 59 at terminal 59a and to the input of 2-stage shift register 61. A second 2-stage shift register 63 is coupled in series with the 2-stage shift register 61 between terminal 57 of summer 55 and input terminal 59b of summer 59. The 2-stage shift registers 61 and 63 are clocked at four times the subcarrier cycle by a source (not shown but may be provided by write clock generator 39 in FIG. 6) so that the signal provided at terminal 59b is delayed one full subcarrier cycle from that applied to terminal 59a or, as expressed for the samples represented in FIG. 3, $\frac{1}{2}$ ($T_E+B_E$) is summed with $\frac{1}{2}$ ($T_A+B_A$). One-half of this sum is provided at the output terminal 59c of summer 59 to input 65a of summer 65 $\frac{1}{4}$ ($T_A+T_E+B_A+B_E$). The samples in middle line M are provided between delays 53 and 54. These samples in the middle line are applied thru a 2-stage shift register 67 which is also clocked at four times the subcarrier cycle by a source (not shown but may also be from write clock generator 39 in FIG. 6). The output from the 2-stage shift register 67 is applied as the second input terminal 65b of summer 65 with the shift register 67 providing a one-half subcarrier cycle delay with respect to the sampled elements $T_E$ and $B_E$. The summer provides one-half the value of the sum at its output terminal 65c. The output amplitude at point X therefore follows step (1) where the value at point X may be represented mathematically as equal to $\frac{1}{2}M_C+\frac{1}{4}(T_A+T_E+B_A+B_E)$. At point Y, step (3) is achieved by first applying the samples (M line) for example between the two delays 53 and 54 to summer 75 of a first terminal 75a. A second input to terminal 75b of summer 75 is provided via connecting the output of the shift register 67 also to a series connected shift register 77 whereby the two series connected shift registers 67 and 77 are coupled between point M and terminal 75b of summer 75. The shift register 77 is also clocked at 4 times the subcarrier cycle by a source (not shown) but may be from write clock 39 so that at summer 75 the samples added are one-half cycle on either side of point $M_C$. With the summed output being one-half value at its output, the value at terminal 75c is equal to $\frac{1}{2}$ ($M_A+M_E$) for the samples illustrated in FIG. 4. The output of summer 75 is coupled as an input to terminal 79b of summer 79. The second input to summer 79 is coupled between the 2-stage shift registers 61 and 63. The samples taken at the top and bottom lines are delayed via the shift register 61 by 180° and therefore the signal at the input terminal 79a for the samples in FIG. 4 is equal to $\frac{1}{2}$ ($T_C+B_C$). Since these signals are summed at one-half of their value provided at the output terminal 79c, the value at point Y may be expressed mathematically as equal to $\frac{1}{4}$ ($T_C+M_A+M_E+B_C$).

The signals at points X and Y are switched by switch 81 to the output of the compressor 50 which as illustrated in FIG. 6 is coupled to the memory 35 via contact C and arm 51b. The position of the switch 81 is controlled by a signal developed by the logic circuit including EXCLUSIVE OR gate 85. To a first input terminal 85a of gate 85 is provided 280 ns (nanoseconds) wide pulses from pulse generator 87 which are high for first cycle of the subcarrier and a low for the second cycle, high for the third cycle, low for the fourth cycle, etc. To input terminal 85b, is provided a 128 μs (microsecond) wide signal from pulse generator 89 which is high for the first two scan lines of field, low for the second two scan lines of the field, high for the third two scan lines of the field, etc. When the inputs to the EXCLUSIVE OR gate 85 are both high or are both low, a low is provided at the output of gate 85, placing the switch 81 in position of terminal 81X to couple out the signals at point X. When the inputs to the EXCLUSIVE OR gate 85 are high and low, a high is provided at the output of gate 85 placing the switch 81 in position of terminal 81Y to couple only the signals at point Y to the output of the compressor.

As can be seen viewing the waveforms 91 and 92 over the first 280 ns, there is provided a high to inputs 85a and 85b and therefore a low is provided to switch 81 providing the output signal at point X. Over the second 280 ns period, there is provided both a high and a low and therefore the signals at point Y are provided at the output of the compressor 50. This high and low is then repeated at the 280 ns rate over the first two lines of the field. After the first two lines (after 128 µs), the pulse from generator 89 becomes low and therefore there is a high and a low over the first 280 ns period of the third line which provides a high and therefore the output from point Y over the first cycle in the third line. In the second 280 ns period, there are two low's which therefore provides a low and the switch 81 is switched to couple the signals at point X and the system repeats itself over the third and fourth lines of the field.

Figure 8:
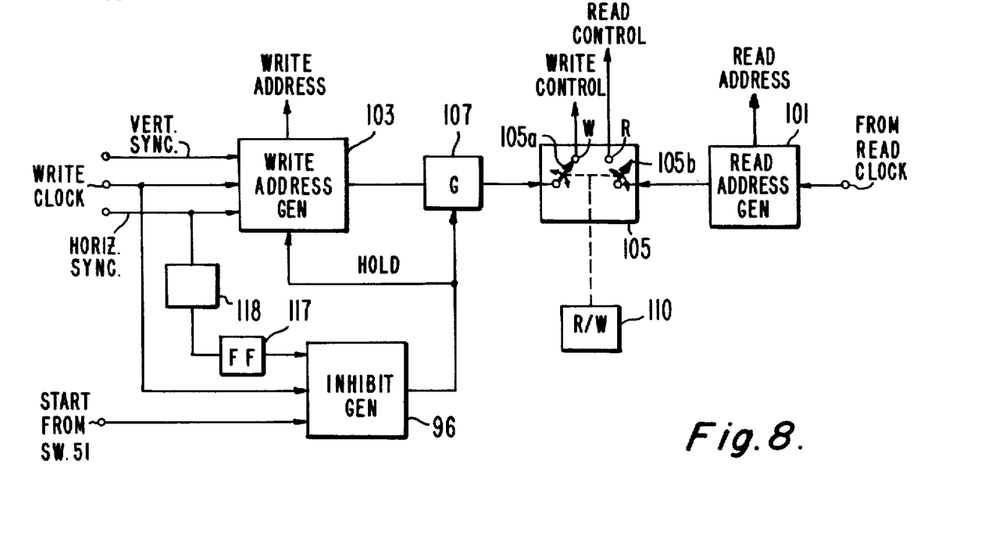
FIG. 8 is a block diagram of the memory control in FIG. 6.

As mentioned previously, the first two samples in the cycle are averaged in the manner described above and the second pair of samples in each cycle are deleted. This deletion is provided for example from switch 51 in FIG. 6 where a contact arm 51c is ganged to arm 51a so that when in the compress mode a high level signal is sent to the memory control 41 to start an inhibit generator therein. Referring to FIG. 8, a more complete description of the operation of the memory control follows. As mentioned previously, the memory control includes a read address generator 101 and a write address generator 103. The write address generator 103 after detecting the termination of blanking (9 µsec delay after leading edge of horizontal sync) provides a write control pulse via gate 107 and read/write switch 105 to the memory and write addresses to the memory. The read/write switch 105 has a control arm 105a which is touching contact W in the write mode. The pulses from read clock 43 are applied to the read address generator 101 and these read addresses are applied to the memory when the read control pulse is provided to the memory. The read control pulse is applied to the memory when read/write switch 105 is in the read position with contact arm 105b touching contact R. Control of the read/write switch 105 is provided by read/write control 110. For more details of the read/write control see above cited application Ser. No. 755,948 of Hopkins. An inhibit generator 96 in the memory control is responsive to the inhibit start signal from the switch 51 in FIG. 6. The inhibit generator 96 is responsive to the horizontal sync pulse (after the 9 µsec delay from the leading edge of horizontal sync) by delay 118 and sampling pulses from the write clock generator for providing a low non-inhibit level for the first two samples or one-half the subcarrier cycle and a high or inhibit level for the second two samples or second half of the subcarrier cycle to the gate 107 and write address generator 103. The inhibit level causes the gate 107 to remove the write control pulse to the memory. The inhibit level to the write address generator 103 stops the incrementing of address to the memory. During the non-inhibit levels, the addresses are incremented and write control pulses are sent to the memory. In order to skip every other line, the inhibit generator 96 is responsive to leading edge of every other horizontal sync for the above compression for providing an inhibit level to the gate 107 and write address generator 103 for removing the control pulse and stopping the incrementing of write addresser to the memory. This skipping of every other line for example can be provided by a flip-flop 117 in the input to the inhibit generator from the horizontal sync.

It is understood that averaging as described herein does not work to find the value of the samples along the top and bottom boundary lines and first and last samples of the line. These samples are simply blanked out or deleted in the compressed picture. It is also understood that the weighting given is by way of example and other similar weighting may be done when compressing the picture. The weighting given is easy to implement with digital circuitry and has been found to produce pleasing results in the picture. This weighting, delays and the summation may also be viewed as a digital filter which is a low pass filter for luminance and preserves chrominance components of the input signal.

Various compression sizes may be made. For example the size may be compressed to a 1/16th by making the compressor 50 comprise a compressor (as described above) a second memory to store the ¼ size of first averaged picture samples and a second compressor for averaging the averaged samples clocked from the second memory to the memory 35. The inhibit generator in the memory control would send inhibit write control pulses in both memories.

By applying the output of the video synchronizer to a video switcher and generating a key signal in the synchronizer indicating the location of a picture in the raster, the conventional video switcher can be used to provide a background signal over which the compressed picture is located. The background, for example, may be another picture. In the above described arrangement for compressing the picture to the ¼ size, the compressed picture when read out at the normal rate would appear in the upper left quadrant.

This television picture compressor may be used with television picture positioning apparatus described in co-pending application filed concurrently herewith entitled "Television Picture Positioning Apparatus," Ser. No. 862,178, filed Dec. 19, 1977, Inventors Thomas M. Gurley, Robert S. Hopkins, Jr. and Wolf-Dieter Fischer (British Provisional filed Mar. 21, 1977 and given No. 11905/77). In accordance with this picture positioning apparatus, the combined apparatus will permit the positioning of the compressed picture in any desired location by adjusting the addresses of the compressed picture as it is stored in the memory. In the case of ¼ size compression this compressed picture may be moved to any position on or off the raster. Also, four different rasters could be compressed with the addresses from the picture positioning apparatus being such that the four compressed pictures are in the four quadrants of a full raster so that when the whole memory is read they may be displayed simultaneously. Although the present invention has been described in terms of a composite video signal according to the NTSC television standards, the principles of skipping lines and deleting samples to compress the picture while also averaging the values of the deleted samples into the samples that are to remain or be stored to reduce the moire pattern are equally applicable to other television standards as PAL, PAL-M and SECAM.

What is claimed is:

1. A color television picture compressor for reducing the size of the television picture in the raster for use with a video synchronizer of the type which samples the incoming video signal at a frequency n times as high as the color subcarrier and normally provides a predetermined number of samples per line and lines per field for a full field raster, comprising:

means coupled to said video synchronizer for deleting samples per line and lines per field for compressing the picture in the television raster and means for averaging the surrounding picture samples to be deleted of the same color subcarrier phase into the value of the compressed picture sample to be maintained to thereby reduce the size of the picture while reducing the moire pattern.

2. The combination of claim 1 wherein there are four samples per subcarrier cycle.

3. The combination of claim 2 wherein the means for deleting the samples includes means for deleting alternate pairs of samples.

4. The combination of claim 3 wherein every other line of the field is deleted.

5. The combination claimed in claim 3 wherein said averaging means includes means for obtaining the value of first alternate pairs of compressed picture samples to be maintained by averaging the surrounding picture samples of the same phase as the picture sample to be maintained.

6. The combination of claim 5 wherein said averaging means includes means for obtaining the value of the pairs of compressed picture samples to be maintained adjacent said first alternate pairs by averaging the surrounding picture samples 180° out of phase with respect to the maintained picture sample.

7. The combination of claim 6 wherein the value of each of said first compressed picture samples is found by giving ⅛ weighting value to each of the four surrounding samples in phase with the maintained picture sample and one-half weighting value to the original centered sample to be maintained.

8. The combination of claim 7 wherein the value of each of said adjacent pairs of compressed samples is found by averaging the surrounding picture samples 180° out of phase and giving these samples all equal weight.

9. The combination of claim 8 wherein the first pair of compressed picture samples in one line is found by averaging the surrounding picture elements of the same phase as the maintained picture element and the first pair of compressed picture samples in the line adjacent said one line is found by averaging the surrounding picture elements 180° out of phase with the maintained picture element.

10. In combination with a color television video synchronizer which includes means for sampling television video at a frequency n times the color subcarrier to provide a predetermined number of samples per line and lines per field, storing means and means responsive to said stored predetermined number of samples per line and lines per field for providing a full field of television video, a video compressor for use therewith comprising:

means coupled to said sampling means for deleting alternate pairs of samples in each line and alternate lines of a field, means for averaging the surrounding picture samples to be deleted of the same color subcarrier phase to obtain the value of the compressed picture sample to be applied to the memory.

11. The combination of claim 10 wherein said averaging means includes means for averaging the in phase samples to be deleted surrounding the sample to be applied to the memory and means for averaging the 180° out of phase samples surrounding the sample to be applied to the memory.

12. The combination of claim 11 wherein said samples obtained by averaging in phase samples are provided in pairs and samples obtained by averaging 180° out of phase are provided in pairs with the pairs derived by averaging in phase samples provided adjacent to pairs provided by averaging 180° out of phase samples.

13. In a television video synchronizer which includes means for sampling television video at a frequency n times the color subcarrier frequency to provide a predetermined number of samples per line and lines per field, means for storing said fields and lines and means responsive to the stored predetermined number of samples per line and lines per field and providing a full field of television video, a method for compressing the video, comprising:

(1) averaging the surrounding picture samples of a given picture sample of the same color subcarrier phase and adding this average into the given picture sample, (2) averaging the next adjacent picture sample in the same manner as step (1), (3) deleting the next pair of picture samples, (4) averaging the third pair of picture samples by averaging each of the third pair of picture samples by averaging the surrounding picture samples 180° out of color subcarrier phase with respect to the subcarrier phase of the center picture sample and placing the third pair of samples next to the picture samples obtained in steps (1) and (2), (5) deleting the next two picture samples, (6) repeating steps (1) thru (4) for the remainder of the line.

14. The method of claim 13 including the following steps:

(7) deleting the next line, (8) averaging each of the first and second picture samples according to step (4), (9) deleting the next two pair of picture samples, (10) averaging each of the third and fourth picture elements of the second line in the manner of step (1) and placing them next to the first two picture elements averaged according to step (4), (11) repeating steps (8) thru (10) until the end of the line, (12) deleting the fourth line, (13) repeating steps (1) thru (12) for the remainder of the field.

15. The method of claim 13 wherein, in step (1) one-eighth weight value is given to the surrounding picture samples and one-half value to the given picture sample to determine the value of the compressed picture sample.

16. The method of claim 13 wherein the method of averaging in step (4) includes giving one-fourth weight value to the said surrounding four picture samples 180° out of phase and no value to the center picture sample.

17. In a television video synchronizer which includes means for sampling television video at a frequency n times the color subcarrier frequency to normally provide a predetermined number of samples per line and lines per field, and means for storing said samples and lines and means responsive to the stored predetermined number of samples per line and lines per field for providing a full field of television video, a compressor for compressing the video, comprising:
   (a) means for deleting alternate pairs of picture samples and for deleting alternate lines of a field,
   (b) means for averaging the surrounding picture samples to be deleted of the same color subcarrier phase as the nondeleted picture sample into the nondeleted picture sample to determine the value of the compressed picture sample maintained when the color subcarrier phase of the picture sample is correct, and
   (c) means for averaging the surrounding four picture samples 180° out of phase with respect to the center nondeleted picture sample to determine the compressed picture sample maintained when the color subcarrier phase of the picture sample is in error by 180°.

18. In a television video synchronizer which includes means for sampling television video at a frequency n times the color subcarrier frequency to normally provide a predetermined number of samples per line and lines per field, and storing said samples and lines and means responsive to the stored predetermined number of samples per line and lines per field for providing a full field of television video, a method for compressing the video, comprising:
   (1) deleting alternate pairs of picture samples,
   (2) averaging the surrounding picture samples of the sample color subcarrier phase as the nondeleted picture sample if the color subcarrier phase is correct to determine the value of compressed picture sample maintained, and
   (3) averaging each of the samples if the color subcarrier phase of the nondeleted picture sample is in error by 180° by averaging the surrounding four picture samples 180° out of phase with respect to the center nondeleted picture sample to determine the value of the compressed picture sample maintained.

* * * * *